United States Patent
Lind et al.

(10) Patent No.: US 9,027,849 B2
(45) Date of Patent: May 12, 2015

(54) SPRAYER THERMAL PROTECTION

(75) Inventors: Robert J. Lind, Robbinsdale, MN (US); Robert G. Gilbert, Plymouth, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 1534 days.

(21) Appl. No.: 10/575,607

(22) PCT Filed: Dec. 29, 2004

(86) PCT No.: PCT/US2004/043580
§ 371 (c)(1),
(2), (4) Date: Apr. 13, 2006

(87) PCT Pub. No.: WO2005/067697
PCT Pub. Date: Jul. 28, 2005

(65) Prior Publication Data
US 2007/0132416 A1   Jun. 14, 2007

Related U.S. Application Data

(60) Provisional application No. 60/534,180, filed on Jan. 2, 2004.

(51) Int. Cl.
*A01G 27/00* (2006.01)
*H02P 29/00* (2006.01)
*B05B 12/08* (2006.01)
*B05B 9/04* (2006.01)
*H02H 7/085* (2006.01)

(52) U.S. Cl.
CPC .......... *H02P 29/0061* (2013.01); *B05B 9/0403* (2013.01); *B05B 12/08* (2013.01); *H02H 7/0852* (2013.01)

(58) Field of Classification Search
CPC .............................. A01G 25/26; A01G 25/165
USPC ................ 239/67–69, 63, 75; 137/72, 80
See application file for complete search history.

(56) References Cited

U.S. PATENT DOCUMENTS

| | | | |
|---|---|---|---|
| 3,555,355 A | 1/1971 | Pfister et al. | |
| 3,569,781 A | 3/1971 | Strachan | |
| 3,697,863 A | 10/1972 | Kilner | |
| 4,335,342 A * | 6/1982 | Tholome ....................... | 318/627 |
| 5,010,264 A | 4/1991 | Yamada et al. | |
| 5,027,841 A * | 7/1991 | Breunsbach et al. ......... | 134/95.3 |
| 5,109,881 A * | 5/1992 | Baker .............................. | 137/72 |
| 5,533,671 A * | 7/1996 | Baer ............................... | 239/10 |
| 5,546,262 A | 8/1996 | Baurand et al. | |
| 5,772,403 A * | 6/1998 | Allison et al. ............... | 417/44.2 |
| 5,808,441 A | 9/1998 | Nehring | |
| 5,868,320 A * | 2/1999 | Laabs et al. ................... | 239/307 |
| 6,020,702 A | 2/2000 | Farr | |
| 6,167,965 B1 * | 1/2001 | Bearden et al. .......... | 166/250.15 |

* cited by examiner

Primary Examiner — Davis Hwu
(74) *Attorney, Agent, or Firm* — Douglas B. Farrow

(57) ABSTRACT

In an electric airless sprayer (16), as the motor (14) temperature approaches allowable limits, several performance cutbacks can be used to prevent overheating. The preferred method is to gradually reduce the controlled pressure. If the temperature continues to rise, the control (20) switches to on/off or deadband control. If the temperature continues to rise in spite of these measures, the control (20) shuts the unit down.

7 Claims, 1 Drawing Sheet

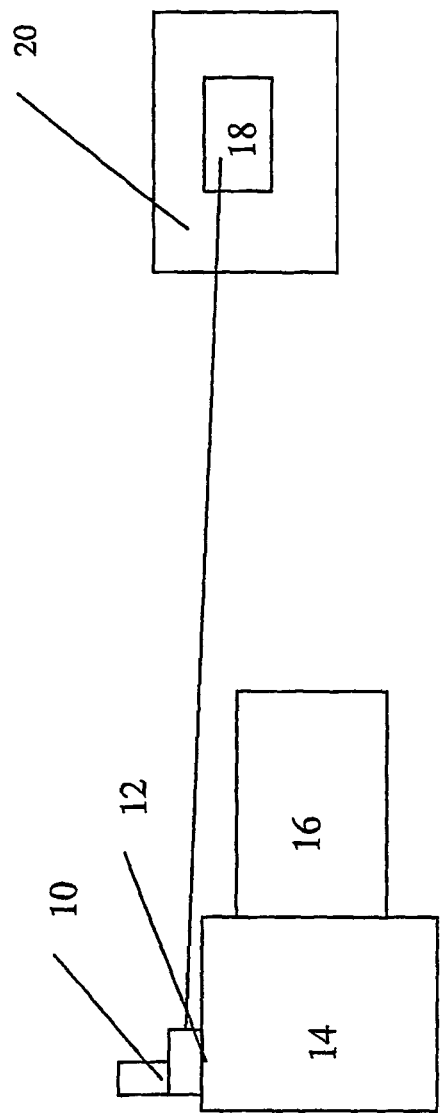

SPRAYER THERMAL PROTECTION

TECHNICAL FIELD

This application claims the benefit of U.S. Application Ser. No. 60/534,180, filed Jan. 2, 2004.

BACKGROUND ART

Electric airless paint sprayers are popular for applying architectural coatings to various structures. Such sprayers typically utilize either on/off (deadband) or variable speed control to maintain a set pressure. Such sprayers are typically provided with thermal protection which shuts off the sprayer when motor temperature exceeds a predetermined level.

DISCLOSURE OF THE INVENTION

It is therefore an object of this invention to provide a thermal protection system which provides enhanced performance to the painter. It is also an object of this invention to provide protection which allows use of a smaller and/or lighter motor while maintaining an acceptable level of performance.

Towards that end a 100 Kohm NTC thermistor is placed in the brush holder of the electric motor in the sprayer to monitor the temperature of the sprayer. The processor on the control board monitors the thermistor output. At temperatures well below the limits of the motor, the sprayer operates at the full selected pressure and variable speed for optimum performance.

As the temperature approaches allowable limits, several performance cutbacks can be used to prevent overheating. The preferred method is to gradually reduce the controlled pressure. If the temperature continues to rise, the control switches to on/off or deadband control. This mode cools better with small spray tips because the fan speed is higher and there is a considerable amount of off time. If the temperature continues to rise in spite of these measures, the control shuts the unit down.

An additional enhancement to the system is to include a requirement in the control logic that control pursuant to the various trip temperatures takes place on while the motor is running. For instance, if the trip point for on/off operation is 140° C., the control would only change to on/off mode after that temperature had been exceeded for 1 minute of motor on time. This helps to compensate for the fact that motor temperature as seen by the thermistor will continue to rise for a bit after the motor has stopped.

These and other objects and advantages of the invention will appear more fully from the following description made in conjunction with the accompanying drawings wherein like reference characters refer to the same or similar parts throughout the several views.

BRIEF DESCRIPTION OF DRAWINGS

FIG. 1 is a schlematic diagram showing the instant invention.

BEST MODE FOR CARRYING OUT THE INVENTION

As shown in FIG. 1, a 100 Kohm NTC thermistor 10 is placed in the brush holder 12 of the electric motor 14 in the sprayer 16 to monitor the temperature of the sprayer 16. The processor 18 on the control board 20 monitors the thermistor 10 output. At temperatures well below the limits of the motor 14, the sprayer 16 operates at the full selected pressure and variable speed for optimum performance.

As the temperature approaches allowable limits, several performance cutbacks can be used to prevent overheating. The preferred method is to gradually reduce the controlled pressure. If the temperature continues to rise, the control 20 switches to on/off or deadband control. This mode cools better with small spray tips because the fan speed (in the motor) is higher and there is a considerable amount of off time. If the temperature continues to rise in spite of these measures, the control 20 shuts the unit down.

An additional enhancement to the system is to include a requirement in the control logic that control pursuant to the various trip temperatures takes place on while the motor 14 is running. For instance, if the trip point for on/off operation is 140° C., the control 20 would only change to on/off mode after that temperature had been exceeded for 1 minute of motor on time. This helps to compensate for the fact that motor temperature as seen by the thermistor will continue to rise for a bit after the motor has stopped.

It is contemplated that various changes and modifications may be made to the thermal protection system without departing from the spirit and scope of the invention as defined by the following claims.

The invention claimed is:

1. A method for thermally protecting a variable speed electric paint sprayer having an electric motor, a control and a temperature, and which operates to maintain a user-selected controlled pressure, the method comprising:
   monitoring the temperature of said electric motor; and
   reducing said controlled pressure from said user-selected controlled pressure and continuing to continuously spray at a reduced consistent non-zero pressure when said electric motor temperature exceeds a predetermined level.

2. The method of claim 1 wherein said change occurs only after said motor temperature has exceeded said predetermined level for a predetermined length of time of motor operation.

3. A method for thermally protecting a variable speed electric paint sprayer having an electric motor, a control and a temperature, and which operates to maintain a user-selected controlled pressure, the method comprising:
   monitoring the temperature of said motor; and
   changing the control of said motor from variable speed control to on/off control when said motor temperature exceeds a predetermined level to enable continued continuous spraying at said user-selected pressure.

4. The method of claim 3 wherein said change occurs only after said motor temperature has exceeded said predetermined level for a predetermined length of time of motor operation.

5. A method for thermally protecting a variable speed electric paint sprayer having an electric motor, a control and a temperature, and which operates to maintain a user-selected controlled pressure, the method comprising:
   monitoring the temperature of said motor;
   reducing the controlled pressure from said user-selected controlled pressure and continuing to continuously spray at a reduced consistent non-zero pressure when said motor temperature exceeds a first predetermined level; and
   changing the control of said motor from variable speed control to on/off control when said motor temperature exceeds a second predetermined level to enable continued spraying at a reduced non-zero pressure.

6. The method of claim 5 wherein said second predetermined level is higher than said first predetermined level.

7. The method of claim 5 wherein said change occurs only after said motor temperature has exceeded said predetermined level for a predetermined length of time of motor operation.

* * * * *